United States Patent [19]

Siclari et al.

[11] 3,978,098

[45] Aug. 31, 1976

[54] METHOD AND ADDITIVES FOR IMPARTING ANTISTATIC PROPERTIES TO POLYAMIDE COMPOSITIONS AND POLYAMIDES OBTAINED ACCORDING TO SAID METHOD AND WITH THE USE OF SAID ADDITIVES

[75] Inventors: Francesco Siclari, Barlassina (Milan); Pierluigi Perazzoni, Paderno Dugnano (Milan) Piergiorgio Silvestroni, Cesano Maderno (Milan), all of Italy

[73] Assignee: Snia Viscosa Societa Nazionale Industria Applicazioni Viscosa S.p.A., Milan, Italy

[22] Filed: Apr. 11, 1973

[21] Appl. No.: 349,951

[30] Foreign Application Priority Data

Apr. 15, 1972   Italy .................................. 23197/72

[52] U.S. Cl. ............................. 260/404; 260/78 A; 260/468 J; 260/471 R; 260/482 R; 260/514 R; 260/519; 260/534 M; 57/157 AS; 252/8.75; 252/8.8; 260/509; 260/513 N; 260/503

[51] Int. Cl.² ...................................... C07C 101/04

[58] Field of Search ............. 260/78 A, 78 SC, 404, 260/514 R, 519, 534 M, 429.2, 448 R, 468 J, 471 R, 482 R, 404.5

[56] References Cited
UNITED STATES PATENTS

| 2,602,087 | 7/1952 | DeGroore .......................... 260/404 |
|---|---|---|
| 2,677,700 | 5/1954 | Jackson et al. .................. 260/404 X |
| 2,881,204 | 4/1959 | Kirkpatrick ...................... 260/404 X |
| 2,943,099 | 6/1960 | Dohr et al. .......................... 260/404 |
| 2,965,658 | 12/1960 | Kirkpatrick .......................... 260/404 |
| 3,040,076 | 6/1962 | Seidel et al. ......................... 260/404 |
| 3,398,163 | 8/1968 | Meyers et al. ....................... 260/404 |
| 3,414,550 | 12/1968 | D'Alelio ......................... 260/78 A X |
| 3,692,819 | 9/1972 | Carney et al. ..................... 260/471 R |

*Primary Examiner*—Patrick P. Garvin
*Attorney, Agent, or Firm*—Shlesinger, Fitzsimmons & Shlesinger

[57] ABSTRACT

An antistatic additive for polyamide compositions and articles is disclosed, which can be concisely defined as a "polyoxyalkylated aminoacid." This class of compounds is preferably prepared by placing the selected aminoacid in the presence of the selected oxyalkylene, in suspension in a liquid medium. The latter is preferably an organic solvent for the polyoxyalkylene, but is a nonsolvent for the aminoacid as such. The polyoxyalkylation is encouraged by the presence of an alkali metal salt of the aminoacid: the sodium salt is preferred. The compounds so prepared have an unpredictably high degree of emulgability towards the polyamides so that a completely satisfactory dispersion of the novel additives in the polyamides can be achieved. Examples of amino-acids are omega-aminododecanoic, omega-aminoundecanoic, epsilon-aminocapronic, (also known as epsilon-aminocaproic) sulphanilic, para-aminobenzoic, 2-aminoethanesulphonic and aminoacetic acids.

Examples of oxyalkylenes are oxyethylene and oxypropylene.

15 Claims, No Drawings

METHOD AND ADDITIVES FOR IMPARTING ANTISTATIC PROPERTIES TO POLYAMIDE COMPOSITIONS AND POLYAMIDES OBTAINED ACCORDING TO SAID METHOD AND WITH THE USE OF SAID ADDITIVES

This invention relates to the production technology of polyamide compositions, more particularly homopolyamide compositions, exhibiting pronounced antistatic properties, which are imparted to the polyamide and the relevant industrial products and articles of manufacture, by the use of additives which are substantially dispersed into the compositions. The invention exhibits quite particularly an interest in the field of spinnable polyamides for the production of textile articles in general, its advantageous application in other fields being, however, not excluded, whenever it is desirable to have polyamide compositions available, which exhibit virtually persistent antistatic properties.

The problem of imparting such desirable properties to polyamide or predominantly polyamide based articles (leaving aside, for example, to the ends and within the scope of the invention, the complementary substances such as matting agents, antioxidants and so forth), has been considered in the appertaining art long since, on account of the well known proneness of polyamide articles and products to the accumulation of even intense electrostatic changes.

A number of methods have been suggested, tested and partly commercially adopted in order to offset, at least partially, this undesirable property of the polyamides. Among the comparatively copious patent literature related to the field of the present invention, reference is made to the U.S. Pat. No. 3,475,898, whose disclosure indicates the principal ones of these methods and gives a virtually comprehensive picture of the state of the art.

Such a picture clearly shows that tangible results (that is, to impress to the polyamides an acceptable antistatic behavior which is retained, at least within certain limits, during progress of the several treatments of the materials and the use of the finished articles, washings and otherwise) can be achieved only by supplementing the polyamide composition, or the monomer mass, with additives which are at least in part hydrophilic. The preferred additives are polyalkyleneethers.

The use of such additives, according to the contemporary art, can follow either of two methods, which are considered incompatible and mutually exclusive, namely:

a. The additives which are essentially insoluble in the polyamide (even though they are so in the monomer) and which are essentially non-reactive with same, are present, both in the polyamide and the finished articles, in the form of a sharply separate phase which is more or less easily extracted under the action of aqueous solvents, washings and others. The resistance to extraction, in general, is more or less proportional to the molecular weight of the additive. Contrarywise, the uniform dispersion in the polyamide mass is roughly inversely proportional to the molecular weight aforesaid. A number of polyalkylene ethers have been suggested and can be used as non-reactive additives. Polyoxylakylene glycols and, more particularly, polyoxyethylene glycol is considered as the most preferred non-reactive additive, on account of several technical and also economical reasons as to their availability or production. At any rate these non-reactive additives do not exhibit to the desirable extent the ability to become intimately and persistently dispersed in a homogeneous manner in the polyamide.

Such an incapability leads to the occurrence of serious drawbacks: the irregular dispersion of the additive, which is not emulgable in the polyamide or is poorly emulgable therewith, is conducive, for example, to corresponding irregularities in the extrusion, and the polyamide-to-additive ratio, in the yarns, varies unpredictably and also to a very large extent in the several points of the extruded filaments. Furthermore, on account of the fact that the additive can be easily extracted, to obtain that the finished article may retain the desired antistatic properties (the prior art suggests 2% of additive on a weight basis, or even less, as an amount which is sufficient to achieve the desired results), after a reasonable service life and a few washings, it is necessary to add an amount which is proportionally much higher (up to 15% or above), to allow for the amount which will be subsequently extracted, the result being apparently undesirable technical consequences from the productive and also economical standpoints.

b. The second approach, conversely, consists in employing reactive additives, that is those which are capable of becoming chemically bonded to the polyamide, for example by using, as an additive, a polyoxyalkylene which is terminated by two primary aminic groups, or a dibasic alpha-omega-dicarboxylic acid. An additive of this kind, such as dicarboxylated polyoxyethylene, is stably bonded to the polyamide and imparts persistent antistatic properties to the polyamide finished articles.

This second method, however, exhibits, in turn, other, if not more serious, shortcomings. Due to the very fact of being capable of becoming chemically bonded to the polyamide, an additive of this kind leads to the formation of a copolyamide which, as is known, exhibits, as compared with the starting, homopolyamide, a lower elasticity modulus and, in general, physical properties, service life and resistance which are depreciated. In addition, the polyoxyethylene content (which is required to impart the anti-static prerequisite) leads to the evolution of important volumes of foam during polymerization, which involves production limitations on account of the capillary-active nature of the copolymer. In addition, the reaction water as evolved by reactive polyoxyalkylenes, that is those which are susceptible of amidation, prevents the desired viscosity and molecular weight from being attained in the treatments which do not take place under vacuum, such as column polymerization runs.

Bearing the foregoing considerations in mind, it is an object of the present invention to recognize and to use, in order to impart to polyamide compositions virtually persistent antistatic properties, additives consisting of polyoxyalkylene derivatives, which exhibit a combination of the advantages inherent in both the reactive and the non-reactive additives as known in the technical art, without, however, displaying, or at the most displaying to an extremely little extent or even to an almost negligible extent, the defects of the prior art additives, and without impairing the clearness rating of such polyamide compositions.

These additives are advantageously added in amounts from 1% to 20% and preferably from 2% to 15%, on a weight basis, with respect to the polyamide.

The additives which are characteristic of the invention, to be defined and exemplified in the following, consist of clear-coloured products which, within the field of knowledge of the applicants and their comprehensive research, are not known. Consequently, it is also the subject of this invention to identify and to adopt such conditions as to make their obtention possible, including a complete sequence of steps for their preparation.

Moreover, it is the subject of this invention to identify the ability of such novel additives efficiently to contribute towards the homogeneization and stabilization of known polyoxyalkylene additives in a polyamide composition and, consequently, to employ mixtures, or anyhow associations of such known and novel additives in order to impart antistatic properties to polyamides.

Within the scope of this invention there are also the industrial products which are obtained with the use of such additives, or basically polyamide-containing compositions and fundamentally polyamide-based articles which comprise such novel additives and retain the best possible clearness or whiteness rating.

In the broadest aspect of the invention, the additive consists of a polyoxyalkylenation product of an aminoacid, which is possibly either salified or esterified.

The novel additives according to the invention can be defined and so will be hereinafter, by the phrase "polyoxyalkylated aminoacid", with the exception of those cases where the nature and the type of the aminoacid and/or the polyoxyalkylene is more accurately indicated. Such an additive comprises a monovalent group having the following expression:

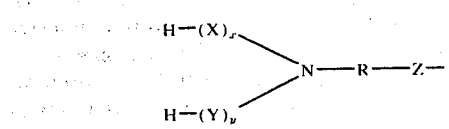

wherein:
X is an oxyalkylene unit;
Y is an oxyalkylene unit;
R is an aliphatic radical, or a cycloaliphatic radical, or an aromatic radical, or a mixed radical;
Z is a carbonyl radical or a sulphone radical;
W is any monovalent radical or group;
N is nitrogen and H hydrogen;
$x$ is comprised between 1 and 1500 and represents the number of the recurring units which are present in the polyoxyalkylene chain;
$y$ is zero or a number comprised between 1 and 1500;
the free valency of the monovalent group being saturated by a monovalent radical such as —OH, O Me$^I$ (wherein Me$^I$ is an alkali metal), —OR (where R is an alkyl radical), or O(K)$_k$ —H where K in an oxyalkylene unit and k is a number between 1 and 1500, or being saturated by a valency of a bivalent radical or a trivalent radical such as for example —O Me$^{II}$O—, —O Me$_2^{III}$O (wherein Me$^{II}$ is an alkaline earth metal and Me$^{III}$ is a metal of the third group of the Periodic Table, two or three groups of said formula being in such a case correspondingly bonded to said bivalent or trivalent radical.

In such an expression $x+y+K$ should not be less than 20 and $(X)_x + (Y)_y + (K)_k$ should be at least 70% by weight of the compound.

Although the well known chemical behaviour analogy of the different aminocarboxylic or aminosulphonic acids, and also the analogies of the different oxyalkylenes, to the ends of the polyoxyalkylation processes and the effect of the additives according to the invention as associated to the polyamide, permit to dispense with the introduction of unjustified limitations in the subject of the invention, starting materials are indicated hereinafter, which, due to their ascertained analogy of behaviour and also for reasons of availability and economical reasons are deemed to be more advantageously utilized for the reduction to practice and the industrial use of this invention.

Therefore, among the aminoacids there are indicated: omega-aminododecanoic acid, omega-aminoundecanoic acid, epsilon-aminocaproic acid, (also known as epsilon-aminocaproic acid) sulphanilic acid, para-aminobenzoic acid, 2-aminoethanesulphonic acid and aminoacetic acid.

Among oxyalkylenes, oxyethylene and oxypropylene can advantageously be employed.

Likewise, the attainment of the persistent antistatic properties of polyamide compositions, which is the final object of the invention, is practically extended to any polyamide, on account of the analogy which exists thereamongst, and due to this reason a limitation is deemed unjustified for the invention even in this sense. Such an analogy has been experimentally confirmed between polycoproamide, hexamethylene diamine polyadipate, metaxylenediamine polyadipate and polyundecaneamide.

As it stems from its very definition, a polyoxyalkylation product of an aminoacid is obviously obtained by subjecting the selected aminoacid to a polyoxyalkylation process. Although the polyoxyalkylation methods and implementations (appropriately equipped autoclaves or installations which operate continuously) are well known both in the laboratory and industrial chemistry, the Applicants are not aware (as outlined above) that aminoacids have ever been subjected to polyoxyalkylation under such conditions as to lead to the obtention of the additive which is characteristic of the invention.

The possibility of carrying out such a polyoxyalkylation depends upon certain critical conditions, whose identification is also a subject matter of the invention, and make up a complement and an integration of the present technical knowledge.

The obtention of the additive according to the invention assumes that in the polyoxyalkylenized compound the aminoacid is present in a substantially monomeric form. A first critical condition is thus that of preventing the aminoacid as such from polymerizing.

It has been ascertained that such a critical condition is achieved by firstly excluding the aminoacid (which is solid at room temperature) from being brought to its melting point, that is to a state in which it is susceptible of polymerizing either quickly or irreversibly, and then being brought into the presence of the oxyalkylene. Another important condition is that the polyoxyalkylation process takes place in a medium which, in itself, does not give rise to chemical side reactions, at least to a substantial extent. On the other hand, the solvents of the aminoacids ares susceptible in themselves of a vigorous polyoxyalkylation, whereas the means by which it is desired that the expected polyoxyalkylation of the aminoacid takes place should not exhibit such a susceptibility.

Thus, according to a complementary feature of the invention, the polyoxyalkylenated aminoacid is produced by placing, at least initially, the selected aminoacid in the presence of the oxyalkylene which has been concurrently selected, in a state of a suspension in a liquid medium which is substantially inert with respect to both the starting compounds, more particularly a liquid which cannot be oxyalkylated. According to an identification which is also a feature of the invention, such a condition is thoroughly fulfilled by employing an organic solvent, preferably an aromatic one, of the polyoxyalkylene, which is not a solvent of the aminoacid as such, as a suspension medium for the aminoacid.

The polyoxyalkylation process is performed, in one or more subsequent stages, by gradually adding the selected oxyalkylene to the aminoacid in suspension. The oxyalkylation reaction proper (in the sense of the formation of a chemical bond between the aminoacid and the oxyalkylene) takes place at the beginning of the process, presumably by interfacial reaction between the aminoacid as dispersed in said liquid medium and the alkylene oxide as dissolved in the same chemical medium. The occurrence of such an initial reaction is confirmed by the fact that the aminoacid which has been reacted is dissolved in the same chemical medium, in which it was originally insoluble. The progress of the reaction leads to polyoxyalkylation, with a gradual increase of the chain length or of the length of the polyoxyalkylene chains. The degree of polyoxyalkylation can be directly ascertained from the ratio between the weight of the aminoacid as originally brought in the presence of the alkylene oxide and the weight of the polyoxyalkylated product thus obtained, on taking into account the molecular weights of the reactants. The molecular weight of the obtained polyoxylakylenate can be ascertained, in addition, conventionally, from different physical properties thereof, such as the relative viscosity, the melting point and so forth.

The polyoxyalkylation reaction is preferably encouraged and accelerated by using a compound which is adapted to display a catalyst activity. A compound capable of fulfilling such a task is an alkali metal salt, more particularly a sodium salt, of the aminoacid to be polyoxyalkylenated as such.

Thus, a preferred form for carrying out the process of preparation of the additive according to the invention, comprises the separate preparation of the alkali metal salt of the selected aminoacid, the introduction, in such a liquid environment or medium of such an aminoacid at least in the form of its sodium, or anyhow an alkali metal salt, said liquid medium fulfilling the requirements of (a) not dissolving the aminoacid and its salt but maintaining same in suspension; (b) being a solvent of the polyoxyalkylenated aminoacid; (c) being not capable of polyoxyalkylation by the selected alkylene oxide, but, (d) being a solvent for the latter, the introduction of said selected alkylene oxide in said medium, being continued until at least a reacted intermediate is obtained which is soluble in said liquid medium, and the addition, in the same medium or in a separate medium, of additional alkylene oxide until obtaining the polyoxyalkylenated aminoacid to the desired degree.

The possibility of the actual reduction of the invention to practice, along with the principal advantages stemming therefrom, will become apparent during progress of the ensuing detailed description of examples and showings of both the ones and the others. These examples and demonstrations, in order to avoid useless repetitions, have been limited to a few possible technical and chemical approaches only which can be adopted to achieve the advantages of the invention, and thus that which follows is in no wise a limitation of the invention.

Demonstration of the unpredictable high emulgability power of the novel additives in polyamides

EXAMPLES 1 AND 2

In order to obtain a striking demonstration, two typical examples of the novel additives made according to the invention, i.e. polyoxyalkylenated aminoacids, have been added to a polyamide which has been polymerized according to a conventional laboratory procedure, which is adapted to originate a sharp separation of additives which are not susceptible of amidation, such as suggested and used by the conventional art. Such a procedure has also been carried out under rigorously equal conditions with other known additives, selected among those which are most commonly known and used for imparting antistatic properties to polyamide compositions.

In an aluminum block having a plurality of pockets and adapted to be evenly heated (to ensure the evenness of the treatments), there have been lodged six glass test tubes, equipped with inlet and outlet tubes and anyhow prepared for performing the usual laboratory runs for the polymerization of polyamides.

Each of these test tubes have been identically charged with:

100 grams of monomeric caprolactam
3 grams of hexamethylenediamine adipate
3 grams of distilled water, and
0.3 grams hexamethylene diamine.

(Hexamethylene diamine adipated and hexamethylene diamine have been added, still according to the current practice, as a reaction catalyst and as a viscosity stabilizer, respectively).

In the individual different test tubes there have been added, moreover, in identical amounts of 5 grams each (that is, in an amount of 5% by weight, calculated on the monomer), partly an aminoacid which has been polyoxyalkylated according to the invention, and partly known polyoxyalkylene additives, thus obtaining examples of practice of the invention and comparison tests, respectively, under homogeneous conditions so as to render the comparison reliable.

These additives are listed in Table I below, which also identifies said examples and said comparison tests.

TABLE I

| Example, or Comparison | Polyoxyalkylene additive (in an amount of 5% by weight) |
| --- | --- |
| Example 1 | Polyoxyethylenated omega aminoundecanoic acid, mol.wt. 15.000 (A product has been specifical- |

TABLE I-continued

| Example, or Comparison | Polyoxyalkylene additive (in an amount of 5% by weight) |
|---|---|
| | ly used which has been obtained by working as specified hereinafter in Examples 8, 10 and 12) |
| Example 2 | Polyoxyethylenated sulphanilic acid (by workking as described hereinafter in Examples 9, 11 and 12) mol.wt. 14.000 |
| Comparison A | Polyoxyethylene with a mol.wt. of 20,000 |
| Comparison B | Polyoxyethylene having a mol.wt. of 3,500 |
| Comparison C | Polyoxypropylene having a mol.wt. of 4,000 |
| Comparison D | Polyoxyethylenated hexamethylene diamine, mol.wt. 15,000 |

Upon a repeated scavenging with nitrogen to remove oxygen completely, the aluminum block has been heated to 250°C. Upon melting of the caprolactam, the contents of all of the test tubes appears perfectly liquid and homogeneous. This is justified by the fact that all the introduced additives are thoroughly soluble in the monomer.

After a 2-hour reaction at 250°C, the caprolactam is predominantly converted into polyamide and the conditions occur, under which, since the known polyoxyalkylene compounds are substantially insoluble in the polycaproamide, the separation of the heterogeneous phases ought to have already taken place, at least to a predominant extent. The condition which is of interest to the ends of the present demonstration which exemplifies the advantages of the invention, is the condition of homogeneousness, at least the physical one, of the mass comprising the two polyamide and polyoxyethylene phases, that is, the degree of homogeneization of the emulsion which has been formed, more or less completely. By checking such a condition, it becomes thus possible to determine the "emulgability degree" of the additives intended to impart to the polyamides the desired antistatic nature.

Now, while in all the comparison tests A-B the physical separation of the phases has taken place in a sharp and unquestionable manner, with the formation of a supernatant polyoxyalkylene layer on the surface of the polyamide mass (a consequent demonstration of the poor or non existent emulgability of the known additives), the contents of the test tubes relating to Examples 1 and 2 has remained substantially homogeneous and clear without any formation of a discrete phase film on the surface of the supplemented polyamide or with a virtually imperceptible formation.

This is an evidence that the novel additives, polyoxyalkylenated aminoacids, characteristic of the invention, exhibit to the most desirably high degree the property of being emulged in the polyamides, by forming therewith, within the practical limits, a single phase, or at least an emulsion in which the phases are evenly, finely and intimately dispersed to such an extent that they cannot be virtually distinguished.

Under this respect which is the essential practical one and is to be considered from the standpoint of the industrial exploitation of the invention, the behaviour of the novel additives, in polyamides, is more similar to that of the additives of the kind which are susceptible of amidation, that is, those which are prone to lead to the formation of copolyamides and other serious and well known shortcomings.

A reliable, though approximate quantitative evaluation of the emulgability of the several additives according to the invention and of comparison additives has also been carried out.

This evaluation has been carried out by measuring the heights of the two polyoxyethylene and polyamide phases, which exhibited themselves in discrete and superposed layers, in the test tubes (the test tubes of Examples 1 and 2 being excepted, inasmuch as, in them such a separation could not be ascertained or at least reliably measured). By referring the volume of the polyoxyalkylene phase as obtained to the volume in the liquid state of the same additive as initially charged, there has been evaluated, in percent, the degree of volumetric separation between the phases, by operating under the above described conditions of identical addition and polymerization:

| Example and comparison | Degree of separation |
|---|---|
| 1 | near 0% |
| 2 | near 0% |
| A | near 100% |
| B | in the order of 80% |
| C | near 100% |
| D | in the order of 100% |

EXAMPLE 3

To demonstrate the already pointed out and unpredictable property of the polyoxyalkylated aminoacids, which is characteristic of the invention, to act as efficient emulsifying agents, in a polyamide mass, for other polyoxyalkylene additives which cannot be subjected to amidation, and thus cannot be emulsified or so can be with difficulty or which are not anyhow dispersible in the desired way, there have been added, instead, in a seventh test tube, charged and treated as described above:

3 grams of polyoxyethylenated omega-aminoundecanoic acid having a mol. wt. of 15,000 (i.e. the novel additive of Example 1).

3 grams of polyoxyethylene with a mol. wt. of 20,000 (the known product of Comparison A)

to a total of 6% on the weight of the monomer susceptible of polyamidation.

On completion of the procedure as described for examples 1 and 2, the reacted mass proved to be substantially homogeneous and the physical separation of the polyamide and the polyoxyalkylene phases was detectable with difficulty. The corresponding volumetric separation test gave a value in the order of 5%.

The capacity of polyoxyalkylated aminoacids to act as emulsifying agents for additives which cannot be subjected to amidation, and have a strong tendency towards becoming separated from a polyamide mass (see the result of the Comparison A test) is evident.

Demonstration of the advantages of the novel additives in comparison with the known additives which can be subjected to amidation

EXAMPLE 4

As indicated above, additives are known and are sometimes used, which are adapted to impart antistatic properties to polyamides and are capable of being evenly dispersed and stably fixed therein, forming a single phase. This is due to the fact that such known additives are susceptible of amidation, that is, they are capable of copolymerizing with the amide monomer. Even apart from the fact that the copolyamides thus necessarily obtained exhibit physico chemical specifications which impart to the article obtained thereby properties which generally are undesirably below those resulting from the use of the corresponding omopolyamide, the use of additives which are susceptible of amidation leads to the occurrence of serious defects.

On considering that polyoxyalkylated aminoacids, made according to the invention, behave, under certain respects (commented in Examples 1, 2 or 3), in a manner which is similar to that of the additives which can be subjected to amidation, it has been ascertained, as will be discussed below, that these novel and advantageous additives do not exhibit, in turn, at least a part of the defects of the known additives capable of being amidated.

To this end, the polymerization has been carried out, under identical conditions to be described hereinafter, of caprolactam supplemented with equal amounts of polyoxyethylenated omega undecanoic acid, mol. wt. 15,000 (the product of Example 1) and, respectively, of a known polyoxyalkylene additive which can be amidated, and exactly dicarboxylated polyethylene glycol (mol. wt. 20,000).

Two discrete and equal test tubes, of the kind used for laboratory runs (as indicated in Examples 1 and 2) have been identically charged with:

| | | |
|---|---|---|
| 100 | grams | caprolactam |
| 3 | grams | distilled water |
| 3 | grams | hexamethylene diamine adipated (as a catalyst) |
| 0.200 | grams | of hexamethylene diamine (as a viscosity stabilizing terminating agent), |

In the two test tubes there have been added, respectively:
Example 4: 6 grams of the novel additive of Ex. 1
Comparison B: 6 grams dicarboxylated polyoxyethylene glycol, (mol. wt. 20,000) salified with the stoichiometrical equivalent (i.e. 0.03 grams) of hexamethylene diamine.

The polymerization reaction is started and continued as described in Examples 1 and 2. Upon reaching the melting of the caprolactam, both the additives are well dissolved in the monomer (that which could be foreseen on account of the fact that it can be amidated) forming a single phase with the polyamides the latter is being gradually formed.

On the other hand, as the reaction proceeds, the strong capillary active character of the comparison additive is manifested, which causes the formation of a bulky foam: the latter, under vacuum, clogs the discharges of the relative test tube while the reaction proceeds and is terminated in a wholly regular manner in the test tube relative to the present Example 4.

A similar behaviour has been experienced by carrying out corresponding polymerizations in an autoclave, that is, operating under conditions of an industrial nature.

On considering the results of Examples 1, 2 or 4 together, it is thus apparent that the invention has permitted solving the known problem of incompatibility between the obtention of a high degree of emulgability of the additive (which is not obtained with the known polyoxyalkylene additives which cannot be amidated), and, respectively, of the formation of foam or other known drawbacks of the additives susceptible of amidation.

Demonstration of the advantages afforded, in the extrusion process, by the polyamides which have been made antistatic according to the invention

EXAMPLES 5 AND 5BIS

Examples 1 and 2 have shown the unpredictable high degree of emulgability, in polyamides, of the polyoxyalkylenated aminoacids of the invention, as compared with the known additives which cannot be amidated. There will now be shown the actual advantages which stem, in a more properly industrial field, from the use of the novel additives to render the spinnable polyamides antistatic, to the ends of the spinning of polyamides supplemented with additives prior to their polymerization, that is, by adopting a method which is generally regarded advantageous and preferable over that of the addition and dispersion by mechanical means, of the additive during the spinning and extrusion stages.

To this end there have been carried out, under identical conditions and in a 60-liter autoclave, three polymerization procedures by charging the autoclave, at each test run, with 30 kilograms caprolactam and 0.300 kilograms of distilled water, but supplemented with a polyoxyalkylated aminoacid according to the invention, and with known polyoxyalkylene additives which cannot be amidated, respectively, that is:

| Example and Comparison | Additive | Amount | Weight ratio on polyamide |
|---|---|---|---|
| 5 | Polyoxyethylenated omega aminoundecanoic acid mol.wt. 15,000 (the additive of Ex. 1) | 1800 grs. | 5.66% |
| F | Polyoxyethylene, mol.wt. 20,000 (additive of Comparison A) | 900 grs. | 2.83% |
| G | Polyoxy-isopropylene, mol.wt. 4,000 (the additive of Comparison C) | 900 grs. | 2.83% |

It can be seen that the novel additive of Example 5 has been added in an amount which is twice that of the known additives of the comparisons F and G, in order to obtain a proportionally enlarged evidence of the negative phenomena of which the use of the novel additive could be held responsible.

The products of the three polymerizations have been extruded to form thick fillets or cords adapted to be divided into scales and chips intended for subsequent processing and treatments, according to the conventional art, for the production of different textile and industrial articles.

However, while the product of the polymerization arranged according to the present Example 5 has been extruded regularly, that is, from the fractions fed initially to the extruder to those fed the last, the end fractions of the extruded cord of the product of the comparisons F and G have shown considerable irregularities as to extrusion and composition, breakages occurring frequently. These irregularities have been, at least predominantly originated by the accumulation of the additives (which cannot be satisfactorily emulsified) on the surface of the polymer mass, thus confirming the demonstration given by the preceding Examples 1 and 2. It is apparent that the consequent unevenness of the scales taken from said irregular cords leads to corresponding irregularities and defects in the end products, unless one effects expensive selections, to discard a considerable portion of the materials and semiprocessed items and so forth.

The performance of the present Example 5 has permitted to ascertain other not negligible advantages of the invention, namely:

the scales as produced according to the present Example 5 had a colour which was better, perfectly clear, and more uniform than those obtained according to both comparisons F and G;

filaments produced by starting from scales or chips made of the product of present Example 5 have permitted to obtain fabrics endowed with very high antistatic properties, the latter having been persistently retained in spite of numerous washings under heavy conditions and with the use of commercial detergents.

To complete this latter achievement, the present Example is supplemented by the following:

EXAMPLE 5 Bis

The polyamide as obtained according to Example 5 has been spun and there have been produced 120/8 yarns (with conventional methods) as used for the manufacture of fabrics. Corresponding yarns and fabrics, for comparison, have been prepared and these had not been supplemented with antistatic products of a persistent character.

All fabrics have undergone 10 washings, in water at 80°C supplemented with 0.1% of a commercial detergent for washing machines ("Dixan" commerical name of Henkel S.p.A.) and subjected to ohmic resistance tests (with a megaohm-meter MEGASIS type ME of the firm SIS, ing. Manassi, Milan, Italy) under different environmental conditions as to relative humidity, the following results, in ohm.cm$^{-1}$ having been obtained:

| Fabrics | Relative humidity | |
|---|---|---|
| Example & Comparison | 40% | 60% |
| Example 5bis | $2.10^{10}$ | $4.10^8$ |
| Comparison H | $410.10^{10}$ | $810.10^8$ |

Demonstration of the improved persistance of the antistatic properties in the articles produced according to the invention In the preceding exemplary demonstrations there have been set forth the special and unpredictable advantages resulting from the identification and the use of the novel additives as consisting of polyoxyalkylenated aminoacids, these advantages being predominantly due to their very high degree of emulgability in the polyamides. An important advance which has actually been afforded by the invention to the state of the art consists in the fact that the polyamides, especially for textile uses, which have been made antistatic by these novel additives, retain their antistatic properties even after treatments and with the use and under actions which would be conducive to the extraction, at least to a degree, of the polyoxyalkylene additive phases or fractions. These advantages, which have already been partly shown in the preceding Example 5bis, are present irrespective of the way in which the additives are introduced, that is, both before and after the polyamide polymerization.

EXAMPLE 6

In a continuous polymerization tube of the capacity of 20 kilograms an hour, a mixture is fed, having the following composition:

| | |
|---|---|
| caprolactam | 100 parts by weight |
| distilled water | 0.25 parts by weight |
| polyoxyethylenated omega-aminoundecanoic acid, mol. wt. 15,000 (the additive of Example 1) | 3 parts by weight |

From the tube bottom through a 120-hole spinneret, filaments are obtained which are collected on spools. The filaments on the spools have been collected into a single tow which has been drawn, crimped, heat set with steam and washed to remove the monomer by using a conventional machine for processing polyamide filaments to be converted into staple. The tow is then severed and the obtained staple is used for producing a yarn with which a mat is made, which exhibits very satisfactory antistatic properties. Upon performing 12 consecutive dry washings, which ensure, inter alia, the complete removal of possible finishing oils, samples of the mat have been subjected to friction with a pad coated with a polyester fabric, under conditions which usually lead to the accumulation of intense electrostatic charges, whereafter measurements have been taken with a Locator Electrostatic made by the SIMCO COMPANY, INC., 920 Walnut Street, Lansdale, Pennsylvania, USA, under standard conditions. With a relative humidity of 40% and at 25°C, the electric potentials which have been read have given values which are at least 10 times less than those obtained on an identical mat, as produced with a corresponding yarn, but made with a polyamide without additives. For example, voltages in the order of from 500 to 1000 volts have been obtained for the samples containing the additives according to the invention, and voltages of from 15,000 to 30,000 volts for the samples having no additive.

Such low electric potentials are apparently due to the fact that the yarn used, as produced according to the invention, exhibits, in turn, a comparatively high conductivity. Such a consequence, which is otherwise obvious, is confirmed by the following.

EXAMPLE 6 Bis

The ohmic resistance of the staple yarn as produced and used according to the preceding Example 6 has been separately measured after an appropriate washing. In order to maintain, during the washing, a certain dimensional stability of the yarns, these have been used for knitting a knitwear article. The fabric has been subjected to 10 consecutive washings, during 30 minutes each, in distilled water at 80°C, supplemented with 0.1% of a commercial detergent "Dixan" made by Henkel S.p.A. (commercial name). Then the fabric has been unravelled and the yarn thus obtained has been placed on a frame of the kind conventionally used for ohmic resistance tests on yarns, these tests having permitted to note that, under different conditions of relative humidity, the ohmic resistances were about 60 times less than those measured on identical comparison yarns, but made with polyamide without additives.

EXAMPLE 7

A spinning extruder for polyamides has been fed, at the capacity of 3360 grams an hour, with polycaproamide, obtaining 4 yarns of 10 filaments each, which, when properly drawn at a ratio of 1:3.5, have been converted into a normal yarn having a count of 40/10 den. By a conventional gear metering pump, the extruder head is fed, in addition, with polyoxyethylenated omega aminoundecanoic acid (the product of Example 1) in the molten state and at a rate of 336 grams an hour.

The novel polyoxyalkylated aminoacid additive is thus present in an amount of 9.1% of the yarn, by weight.

By way of comparison, with the same extruder, and under the same conditions, similar yarns have been produced from polycaproamide but without any additive.

With both the yarns, according to the example and the comparison, respectively, cylindrical hoses have been made (with a conventional hosiery machine), which, in turn, have been subjected to repeated washing, under the condition as described in the preceding Example 6 Bis. Already during the manufacture of the hoses, it has been ascertained that the yarn as produced according to the present Example, was much less prone to take up electrostatic charges, as compared with the comparison yarn. The yarns as obtained by unravelling such hoses, after having been temporarily collected on cardboard cones, have been wound on frames for the measurement of the ohmic resistance, under different relative humidity conditions. These tests have given the following resistivity values, expressed in terms of ohm.-cm$^{-1}$.

| Yarns | Relative humidity | |
|---|---|---|
| Example and Comparison | 40% | 60% |
| Example 7 | $3.10^{10}$ | $5.10^8$ |

| Yarns | Relative humidity | |
|---|---|---|
| Comparison 1 | $530.10^{10}$ | $720.10^8$ |

Demonstration of the possibility of obtaining polyoxyalkylenated aminoacid and methods therefor In the introductory portion of the specification of the invention, there have been indicated the conditions which, when abode by, are the necessary and sufficient element, according to those skilled in the art, for obtaining and then using to the ends of achieving the advantages of the invention, polyoxyalkylated aminoacids. As a non limiting integration of the foregoing, there are now exemplified procedures which can be adopted for the preparation of the novel additives of Examples 1 and 2.

EXAMPLE 8

Preparation of the sodium salt of the omega aminoundecanoic acid 205 grams of omega aminoundecanoic acid (about 1 gram-molecule) are introduced into 400 mls. distilled water and brought to a boil: the complete dissolution of the acid does not take place. There are added slowly (to prevent splashing) 40 grams (1 mol) of solid sodium hydroxide in pellets. The complete dissolution of the thus salified acid is ascertained. The liquid mass is filtered to remove the possible small excess of the acid and the hot filtrate is concentrated under vacuum until incipient crystallization takes place.

Upon cooling of the solution, crystallization is allowed to proceed and filtration is carried out with suction. On the filter wall there are collected lamellar glossy crystals which are dried in an oven under vacuum at 70°C. Upon determining the nitrogen contents (with the Kjeldahl apparatus) it has been ascertained that the crystals in question are composed by the expected sodium salt. (Theoretical nitrogen: 6.27%; Found nitrogen: 6.25%).

Note: for the above indicated preparation and for that of the novel additive according to Example 1, there has been used, as omega-aminoundecanoic acid, the commercially available product, known as RILSAN monomer (commercial name), produced by the firm AQUITANE ORGANICO. Omega-amino-undecanoic acid has been selected, to the ends of both the preceding and the following exemplification of the invention, on account of its easy availability and also on the basis of economical considerations.

EXAMPLE 9

Preparation of the sodium salt of sulphanilic acid 180 grams of sulphanilic acid (about 1 mole) are dissolved in 300 mls. of distilled water. There are added 40 grams of sodium hydroxide in pellets, previously dissolved in 100 mls. water. The reaction mixture is heated to 100°C.

The solution is evaporated by distillation under vacuum at 250 millimeters of mercury to incipient crystallization. The distillation is discontinued and crystallization is allowed to proceed by cooling. By filtration, there are collected lamellar crystals which are dried in an oven, under vacuum, at 15 millimeters of mercury and at 50°C.

15

Also in this case, the obtention of the sodium salt is checked by determining nitrogen, for example with the Kjeldahl apparatus.

Theoretical nitrogen: 7.17%; Found nitrogen: 7.06%

EXAMPLE 10

Polyoxyethylation of the omega-amino-undecanoic acid 100 grams of omega-aminoundecanoic acid are combined with 50 grams of the relative sodium salt, such as prepared according to Example 8. There are added 250 grams of xylene and the whole is transferred into a flask equipped with a Marcusson joint, reflux condenser and calcium chloride valve. The reaction mixture is brought to a boil up to the complete removal of any traces of water which are possibly present in the suspension. The suspension is then charged in an autoclave adapted to carry out polyoxyalkylations, equipped with a stirrer, heating means and cooling means.

Under the pressure of 4 atmospheres (abs.) and at the temperature of 120°C, there are added slowly 500 grams of ethylene oxide. The demonstration that the aminoacid has reacted with oxyethylene is given by the fact that a homogeneous solution has been formed, with the reacted product dissolved in xylene, in which the starting aminoacid is, conversely, wholly insoluble.

It is observed that the same reaction takes place also without the sodium salt being present, the latter displaying a catalytic action, though more slowly.

The solution in xylene is evaporated at 100°C until completely removing the solvent, by operating under a high vacuum, as produced by a water pump. At this stage the product has the appearance of an oil which is rather fluid when hot.

The oxyethylation process is undertaken again by recharging the autoclave with 100 grams of such an oil and resuming the ethylene oxide feed until additional 1760 grams of the oxide are absorbed. As usual in the polymerization reactions, the reaction takes place ever and ever slowly as the molecular weight of the product is increased, and requires a temperature rise in order that an acceptable reaction velocity may be obtained. For this reason, the temperature is raised to 150°C.

Under the indicated conditions (that is, with the absorption of all the fed-in oxide), oxyethylation is completed within 15 hours. The product which has thus been obtained has, at room temperature, the appearance of a crystalline solid with the following specifications:

Nitrogen number: 0.09 approx. (as determined with the Kjeldahl apparatus)
Melting point: 63°C (as determined by differential thermal analysis).
Relative viscosity: 1.35 (as measured, in a 2% aqueous solution, and at a temperature of 30°C, with an Ostwald viscometer having a dropping time, with pure water, as long as 82 seconds).

EXAMPLE 11

Polyoxyethylation of the sodium salt of sulphanilic acid

The product obtained according to Example 9 is transferred in a 500-ml flask in which there were introduced 250 grams toluene. In the flask, corresponding to that of Example 10, there is carried out the removal of any trace of moisture and then the toluene suspension is transferred in an autoclave as indicated in Example 10 and the feed in of pure ethylene is effected also under the conditions and the sequence as described, the toluene solvent being driven off by distillation under vacuum.

The product thus obtained has given a nitrogen percentage of 0.1% approx., as measured with the Kjeldahl apparatus.

From the preceding Example 10 and 11 it is apparent that the considered carboxylic sulphonic acids and amino-acids can be oxyalkylated and, on account of the strict behavioural analogy from a chemical standpoint, the amino-acids in general can be oxyalkylated. It is also apparent that, once the oxyalkylation run has been started, as evidenced by the fact that the reacted product becomes soluble in the liquid in which the aminoacid was conversely insoluble, the attainment of the desired degree of polyoxyalkylation depends, in practice, upon the amount of alkylene oxide which is introduced and absorbed, within the time and temperature limits in which the reaction can be maintained.

The characteristics of the products obtained in Examples 10 and 11 permit to conclude that polyoxyalkylenated aminoacids have been obtained whose molecular weight is, with a fair approximation, for polyoxyethylated omega-aminoundecanoic acid according to Example 10: mol. wt. 15,000, for polyoxyethylated sulphanilic acid, according to Example 11: mol. wt. 14,000.

Obviously, if it is desired to obtain additives according to the invention, the polyoxyalkylation process could be more intense, for example it can be resumed as suggested in the following:

EXAMPLE 12

Preparation of polyoxyalkylated aminoacids having a high molecular weight 130 grams of the product obtained according to Example 10 are introduced again in the polyoxyalkylation autoclave and further oxyethylated until reaching a weight of 450 grams.

The product obtained is a crystalline solid having the following properties (as measured as specified in Example 10):

| | |
|---|---|
| Nitrogen number : | 0.025% |
| Melting point : | 64°C |
| Relative viscosity : | 1.51 |
| Molecular weight in the order of 50.000. | |

The same method is similarly applied to carry on the oxyethylation of the polyoxyethylated sulphanilic acid according to Example 11.

What is claimed is:

1. A compound for imparting antistatic properties to polyamide compositions comprising a monovalent group having the following formula:

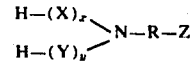

wherein:
X is an oxyalkylene unit,
Y is an oxyalkylene unit,
R is a hydrocarbyl alipatic, hydrocarbyl cycloaliphatic or phenyl radical,
Z is a carbonyl radical, N is nitrogen and H is hydrogen, $x$ is comprised between 1 and 1500 and is the number of the recurring units in the polyoxyalkylene chain, $y$ is zero or a number between 1 and 1500, and wherein the free valency of the monovalent group is saturated by a monovalent radical —OH, —OMe$^I$ (wherein Me$^I$ is an alkali metal), —OR (wherein R is an alkyl radical), or —O(K)$_k$—H where K is an oxyethylene unit and k is a number between 1 and 1500, or being saturated by a valency of a bivalent radical —OMe$^{II}$O—, (wherein Me$^{II}$ is an alkaline earth metal), in such case two groups of said formula being correspondingly bound to said bivalent radical, wherein $(x + y + k)$ is not less than 20 and $(X)_x + (Y)_y + (K)_k$ is at least 70% by weight of the compound.

2. A compound according to claim 1, which is a polyoxyalkylation product of hydrocarbyl amino acid, and wherein the hydrocarbylamino acid is selected from the group consisting of omega-aminododecanoic acid, omega-aminoundecanoic acid, epsilon-aminocapronic acid, para-aminobenzoic acid, and aminoacetic acid.

3. A compound according to claim 1 wherein X is selected from the group consisting of ethylene oxide and propylene oxide.

4. A compound according to claim 1 wherein its molecular weight lies between 800 and 65,000.

5. A compound according to claim 4, wherein its molecular weight lies between 1500 and 35,000.

6. A compound according to claim 1 which is the polyoxyethylation product of omega-aminoundecanoic acid and ethylene oxide.

7. The method of producing the compound of claim 1, comprising placing alkylene oxide in the presence of a hydrocarbyl amino acid in a liquid medium, which is a non-solvent for the acid and is non-reactive towards the acid and the alkylene oxide, so as to inhibit the polymerization of said hydrocarbyl amino acid, and effecting the oxyalkylation of said amino acid.

8. The method of producing a polyoxyalkylene derivative to be utilized as an additive for a polyamide composition to impart thereto antistatic properties, comprising adding xylene to omega-aminoundecanoic acid, bringing the mixture to a boil, and in an autoclave at a pressure of four atmospheres and a temperature of 120°C, slowly adding ethylene oxide, and evaporating the solution under vacuum at 100°C to remove the xylene.

9. The method according to claim 8, wherein the sodium salt of the omega aminoundecanoic acid is combined with the acid prior to adding the xylene.

10. The method according to claim 8, wherein the autoclave is recharged with the product produced by the method of claim 8, and ethylene oxide is again fed into the autoclave until the added ethylene oxide is absorbed, the temperature being raised to accelerate the reaction.

11. A method according to claim 7, wherein said liquid medium is a solvent for the oxyalkylated aminoacid and for the alkylene oxide as well.

12. A method according to claim 11, wherein polyoxyalkylation is started by placing the aminoacid, in suspension in said liquid medium, in the presence of the alkylene oxide, and is continued by feeding in said oxide in the presence of the product of the initial polyoxyalkylation.

13. A method according to claim 7 wherein a catalyst is employed which is an alkali metal salt of the aminoacid to be polyoxyalkylated.

14. A method according to claim 13, comprising preparing in a preliminary stage an alkali metal salt of the selected aminoacid, forming a suspension of said salt and a mixture of said salt and the aminoacid in a liquid (a) which is a nonsolvent for said aminoacid and said salt, but (b) is a solvent for the aminoacid and said salt after an at least initial oxyalkylation thereof, (c) is not susceptible of oxyalkylation by the selected alkylene oxide but (d) is a solvent for the latter, introducing said selected alkylene oxide in the suspension, and effecting an at least incipient polyoxyalkylation until an oxyalkylated intermediate is obtained which is soluble in said liquid, and then introducing an additional alkylene oxide in the presence of said product, to obtain the polyoxyalkylated aminoacid in the desired grade and molecular weight.

15. A method according to claim 14, wherein said liquid is selected from the group consisting of toluene and xylene.

* * * * *